(12) United States Patent
Daxecker et al.

(10) Patent No.: US 12,722,913 B2
(45) Date of Patent: Sep. 1, 2026

(54) TRANSPORT UNIT OF A LONG STATOR LINEAR MOTOR

(71) Applicant: B&R Industrial Automation GmbH, Eggelsberg (AT)

(72) Inventors: David Daxecker, Eggelsberg (AT); Raphael Fölsche, Eggelsberg (AT); Alexander Dicker, Eggelsberg (AT)

(73) Assignee: ABB Schweiz AG, Baden (CH)

( * ) Notice: Subject to any disclaimer, the term of this patent is extended or adjusted under 35 U.S.C. 154(b) by 100 days.

(21) Appl. No.: 18/851,164

(22) PCT Filed: Mar. 28, 2023

(86) PCT No.: PCT/EP2023/058018

§ 371 (c)(1),
(2) Date: Sep. 26, 2024

(87) PCT Pub. No.: WO2023/186906

PCT Pub. Date: Oct. 5, 2023

(65) Prior Publication Data

US 2025/0206548 A1 Jun. 26, 2025

(30) Foreign Application Priority Data

Mar. 29, 2022 (AT) ................................ A50201/2022

(51) Int. Cl.
*B65G 54/02* (2006.01)

(52) U.S. Cl.
CPC .................................... *B65G 54/02* (2013.01)

(58) Field of Classification Search
CPC ...................................................... B65G 54/02
See application file for complete search history.

(56) References Cited

U.S. PATENT DOCUMENTS 4,231,466 A 11/1980 Rathert
4,444,301 A 4/1984 Granberry
(Continued)

FOREIGN PATENT DOCUMENTS

DE 844263 C * 7/1952
DE 862877 C 11/1953
(Continued)

OTHER PUBLICATIONS

International Search Report and Written Opinion for Corresponding International Application No. PCT/EP2023/058018, mailed Sep. 8, 2023, 21 pages.

*Primary Examiner* — Gene O Crawford
*Assistant Examiner* — Keith R Campbell
(74) *Attorney, Agent, or Firm* — McCarter & English, LLP

(57) ABSTRACT

A guide roller or roller unit on a transport unit of a transport device in the form of a long stator linear motor suitable for hygiene applications, includes a first axial end face of a roller of the transport unit which is closed by an end wall and the opposite second end face is open, such that a bearing recess is formed in the interior of the roller, which is axially limited on one side by the end wall, wherein a shaft journal projects through the open second axial end face into the bearing recess and a bearing arrangement is arranged in the bearing recess on the shaft journal, and in the region of the second end face an annular region forming between the centrally arranged shaft journal and the inner circumferential surface of the bearing recess is closed off by a sealing unit.

5 Claims, 4 Drawing Sheets

(56) References Cited

U.S. PATENT DOCUMENTS

| | | | | |
|---|---|---|---|---|
| 6,876,107 | B2 | 4/2005 | Jacobs | |
| 9,056,720 | B2 * | 6/2015 | van de Loecht | B65G 17/06 |
| 10,894,675 | B2 * | 1/2021 | Hartung | B65G 54/02 |
| 10,974,914 | B2 * | 4/2021 | Kleinikkink | B65G 35/08 |
| 2013/0074724 | A1 | 3/2013 | King et al. | |
| 2019/0100389 | A1 | 4/2019 | Neubauer | |
| 2019/0375597 | A1 | 12/2019 | Kleinikkink et al. | |
| 2021/0253372 | A1 | 8/2021 | Kieslinger | |

FOREIGN PATENT DOCUMENTS

| | | | |
|---|---|---|---|
| DE | 10214295 | A1 | 10/2003 |
| DE | 102015226139 | A1 | 6/2017 |
| DE | 102018209727 | A1 | 12/2019 |
| EP | 3462573 | A2 | 4/1987 |
| EP | 1270311 | B1 | 9/2005 |
| WO | 199850760 | A2 | 11/1998 |
| WO | 2013143783 | A1 | 10/2013 |
| WO | 2018145214 | A1 | 8/2018 |

* cited by examiner 9
27
10
6
9a
27
31
33
9b
27
30
6
32
10
29
31
27

TRANSPORT UNIT OF A LONG STATOR LINEAR MOTOR

CROSS-REFERENCE TO RELATED APPLICATIONS

The present application is a national phase entry of International Patent Application No. PCT/EP2023/058018, filed on Mar. 28, 2023, and titled "TRANSPORT UNIT OF A LONG STATOR LINEAR MOTOR", which claims priority to Austrian Patent Application No. A50201/2022, filed Mar. 29, 2022, and titled "TRANSPORT UNIT OF A LONG STATOR LINEAR MOTOR", each of which are hereby incorporated by reference in their entirety.

TECHNICAL FIELD

The present disclosure relates to a transport unit for a long stator linear motor having a base body, which comprises a drive magnet arrangement for moving the transport unit along a transport path and for holding the transport unit on a transport path, and wherein at least one shaft journal is arranged on the base body, on which shaft journal a roller is rotatably mounted, wherein the roller has a first axial end face and an opposite second axial end face, and between the first axial end face and the second axial end face, a bearing arrangement is provided by which the roller is rotatably mounted on the shaft journal.

BACKGROUND

Long stator linear motors and their applications, especially for flexible transport purposes, as well as their functionality have been known for many years. Long stator linear motors generally consist of a plurality of drive coils which are arranged side by side on a support structure and form the long stator of the long stator linear motor. The long stator forms a transport path along which individual transport units can be moved. The possible directions of movement of a transport unit therefore follow the long stator. The transport units are held and guided along the transport path by a guide system. To move a transport unit, drive magnets (permanent magnets or electromagnets) are arranged on the transport unit and interact with the magnetic field generated by the drive coils. By selectively controlling the drive coils, in particular by applying a corresponding coil voltage to generate a coil current, a magnetic field moving in the direction of movement along the transport path can be generated, whereby a transport unit interacting with the moving magnetic field can be moved in the direction of movement (direction of the moving magnetic field). In this way, a plurality of transport units can also be moved independently of one another and simultaneously along the transport path. For this purpose, drive coils in the area of the individual transport units must be energized to generate moving magnetic fields. The design, function and control of such long stator linear motors are well known, which is why they will not be discussed in more detail here. Examples in this regard can be found in WO 2013/143783 A1, WO 98/50760 A2, U.S. Pat. No. 6,876,107 B2, US 2013/0074724 A1, or EP 1 270 311 B1. Normally, a long stator linear motor is constructed with a plurality of coil segments arranged next to one another on each of which a number of drive coils are arranged, as for example in U.S. Pat. No. 6,876,107 B2.

A transport unit must be guided in an appropriate manner along the transport path. For this purpose, guide rollers are arranged rotatably mounted on the transport unit. The transport unit is supported by the guide rollers on assigned guide surfaces on the transport path, and the guide rollers roll on the assigned guide surfaces when the transport units move. A guide roller usually consists of a roller that is rotatably mounted on a shaft journal that is arranged on the transport unit. Rolling bearings are usually used to rotatably mount the roller on the shaft journal, although other bearing types, such as plain bearings, are in principle also possible.

Furthermore, a transport unit for a long stator linear motor is known from US 2019/0375597 A1, wherein the transport unit has a base body. This base body has at least one shaped roller on the one hand and magnetic elements on the other, which interact with a magnetic field generated by drive coils to move the transport unit along the transport path and hold it on the transport path.

Transport devices in the form of a long stator linear motor are also used in so-called hygienic applications in which special hygiene requirements are specified. For example, it may be required that the transport device must be washable, even with a washing medium under pressure (e.g. with a high-pressure cleaner). Another requirement of a hygienic application may be that the long stator linear motor and parts thereof must be designed in such a way that few opportunities for the accumulation of dirt and contaminants result, for example, as few slots, gaps, cavities, etc. as possible. DE 844 263 C, for example, discloses rollers for a chain conveyor in which roller bearings installed in the roller body are secured against external contamination with one or two elastic seals.

A hygienic application of a long stator linear motor therefore requires the smoothest possible outer surfaces on the transport route path and the transport units, and also a strong seal for cleaning purposes. For example, a requirement against the ingress of water into components of the long stator linear motor can be expressed in the same way as for electrical equipment with the IP protection class according to ISO 20653.

In particular, the mounting of the guide rollers poses a challenge with respect to hygiene requirements. Although there are sealed rolling bearings that can be used for bearing, this creates cavities and recesses in the guide roller in the region of the bearing which are undesirable in a hygienic application. Depending on the requirements, non-sealed rolling bearings are only conditionally suitable or even completely unsuitable for hygienic applications. The requirement for a splash-proof design of the guide rollers, in particular in the case of pressurized cleaning media, also poses a challenge.

There is therefore a need to offer guide rollers on transport units of a transport device in the form of a long stator linear motor that meets the requirements in hygienic applications.

BRIEF DESCRIPTION

This is achieved in that the first axial end face is closed by an end wall, and the second end face is open such that a bearing recess is formed in the interior of the roller which is axially limited on one side by the end wall, the shaft journal projects through the open second axial end face into the bearing recess, and the bearing arrangement is arranged in the bearing recess on the shaft journal, and in the region of the second end face, an annular region forming between the centrally arranged shaft journal and the inner circumferential surface of the bearing recess is closed by a sealing unit.

This results in a roller design sealed to the outside and suitable for hygienic requirements which offers few opportunities for dirt to accumulate on the outside and is protected against splash water.

In some embodiments, the roller or the roller unit is part of a guide roller arrangement which consists of the roller, the shaft journal, the bearing arrangement, and the sealing unit, wherein the guide roller arrangement is fastened to the transport unit via an axial end of the shaft journal projecting axially from the guide roller arrangement This makes it easy to replace a roller or a roller unit of a transport unit.

According to some embodiments, a simple, configuration is obtained when the bearing arrangement is designed as a rolling bearing, and the inner ring of the rolling bearing rests on a radial step of the shaft journal, and the outer ring of the rolling bearing is arranged in the bearing recess. It is advantageous, if the inner ring of the rolling bearing is pressed against the radial step with a fixing cap which is screwed into an internal thread of the shaft journal. In addition, the outer ring of the rolling bearing can be axially fixed in the roller by a retaining ring inserted in a circumferential groove of the inner circumferential surface of the bearing recess.

In a particularly advantageous configuration, the sealing unit is designed as a shaft sealing ring. Shaft sealing rings are available in a wide variety of embodiments, which means they can be used flexibly in this application.

BRIEF DESCRIPTION OF DRAWINGS

The present disclosure is described in greater detail below with reference to FIGS. 1 to 6 which show exemplary, schematic, and non-limiting advantageous embodiments of the present disclosure. In the figures.

DETAILED DESCRIPTION

Figure 1:
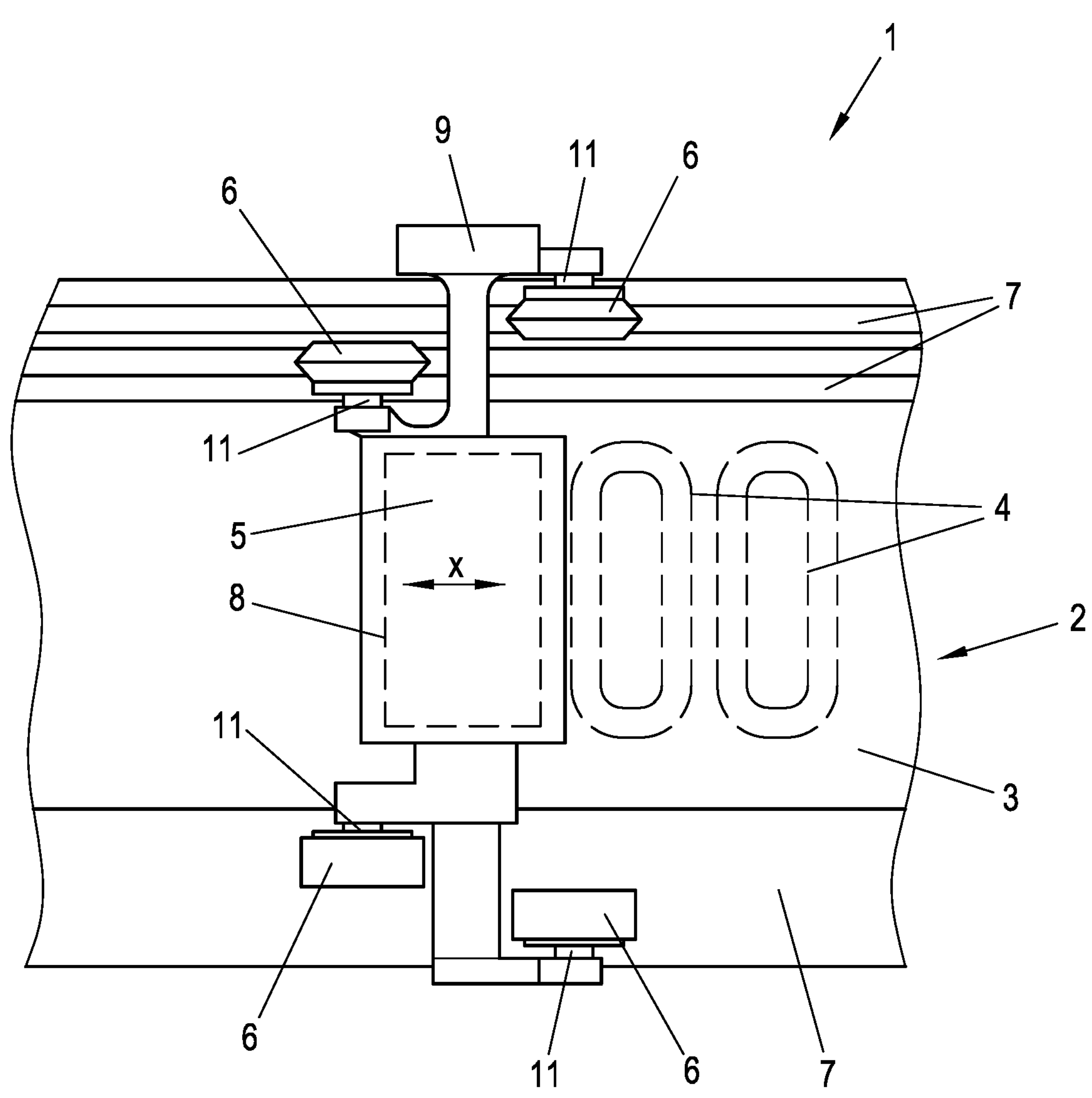
FIG. 1 is a section of a transport path of a transport device in the form of a long stator linear motor with a transport unit.

FIG. 1 shows a short section of a transport path 2 of a transport device 1 in the form of a long stator linear motor. The transport path 2 is formed by the long stator 3 of the long stator linear motor on which a plurality of electrical drive coils 4 (two of the drive coils are indicated by dashed lines in FIG. 1) are arranged along the transport path 2. A transport unit 5 moves in the direction of movement x (indicated by the double arrow in FIG. 1) along the transport path 2. For this purpose, rollers 6 are rotatably mounted on the transport unit 5 and roll on assigned running surfaces 7 on the transport path 2. The drive magnet arrangement 8 required for the movement of the transport unit 5, for example in the form of a permanent magnet arrangement, on the transport unit 5 is indicated in FIG. 1.

For the present disclosure, the number of rollers 6, the geometric shape of the rollers 6 and the running surfaces 7 and the orientation of the axes of rotation of the rollers 6 are irrelevant. When the transport unit 5 moves along the transport path 2, a roller 6 rolls on an assigned running surface 7. Likewise, the shape and geometry of a transport unit 5 is irrelevant for the present disclosure. The transport path 2 can be arranged such that the transport unit 5 travels along the top of the transport path 2 or along the side of the transport path 2. In principle, in a corresponding configuration of the guide system, a hanging configuration of the transport unit 5 on the underside of a transport path 2 is also possible.

In addition to the at least one roller 6, other guide units for guiding the transport unit 5 along the transport path 2 can also be provided on the transport unit 5 if required, for example in the form of sliding surfaces on the transport unit 5, which slide on assigned sliding surfaces on the transport path 2.

The transport unit 5 has a base body 9 on which at least one roller 6 is rotatably mounted. On the base body 9, at least one shaft journal 11 is arranged on which the at least one roller 6 is rotatably mounted.

Figure 2:
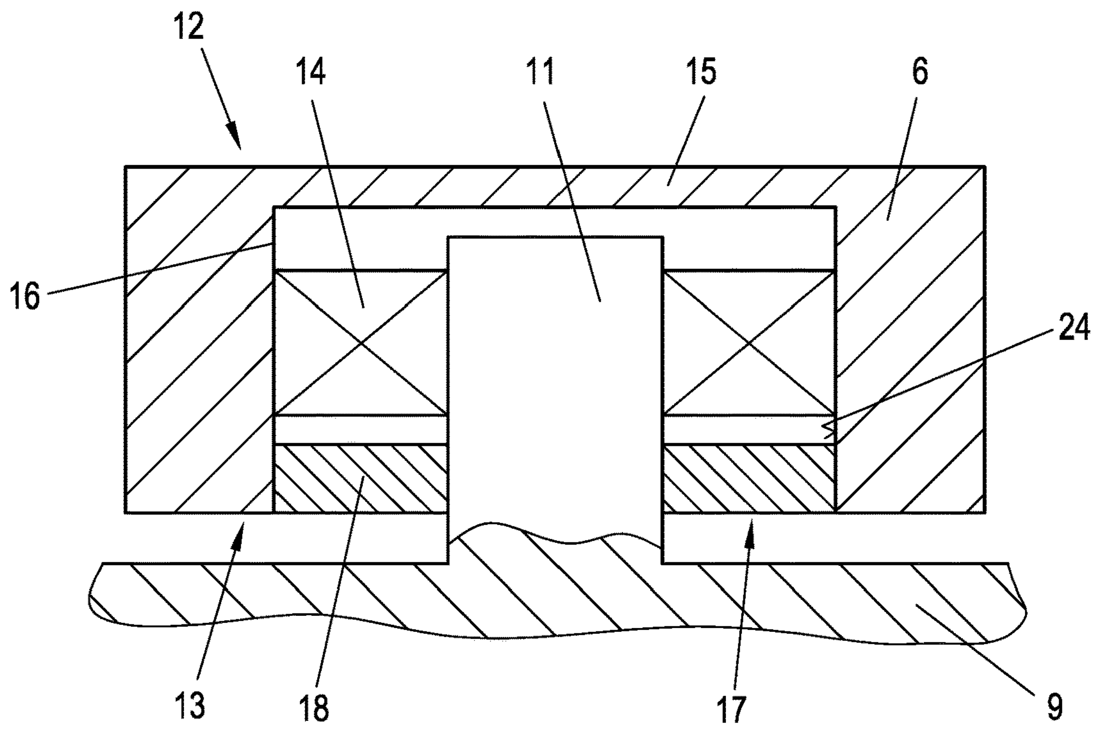
FIG. 2 is an embodiment of a roller or a roller unit on the transport unit.

As shown schematically in FIG. 2, the roller 6 has a first axial end face 12 and an opposite second axial end face 13. The first axial end face 12 is arranged facing away from the transport unit 5 or the base body 9 and thus forms an "outer side" of the transport unit 5. Between the first axial end face 12 and the second axial end face 13, a bearing arrangement 14 is provided by which the roller 6 is rotatably mounted on the shaft journal 11. The first axial end face 12 is designed closed by an end wall 15.

In some embodiments, the end wall 15 is an integral part of the roller 6 such that the end wall 15 is integral with the circumferential wall of the roller 6 forming the running surface. However, the end wall 15 can also be manufactured as a separate component which is attached to one end face of the roller 6, for example in a form-fit, force-fit, or material-fit.

The second end face 13 is open, such that a bearing recess 16 is formed in the interior of the roller 6, which bearing recess 16 is axially limited on one side by the end wall 15 and is open on the other side. The shaft journal 11 projects through the open second axial end face 13 into the bearing recess 16, and the bearing arrangement 14 is arranged in the bearing recess 16 on the shaft journal 11. In the region of the second end face 13, a free annular region 17 is formed between the centrally arranged shaft journal 11 and the inner circumferential surface 24 of the bearing recess 16, that free annular region 17 is closed by a sealing unit 18.

In some embodiments, the sealing unit 18 ends axially as flush as possible with the second axial end face 13, such that an extremely smooth end face arises.

In this way, a sealed roller design can be achieved that has as few cavities, recesses, gaps, cracks, etc. as possible on the outside in which contaminants can accumulate. In addition, the interior of the roller is sealed against liquids. This is ensured by the roller 6, which is closed on the first axial end face 12 and the circumferential surface, and the sealing unit 18, which closes off the bearing recess 16 to the outside.

Figure 3:
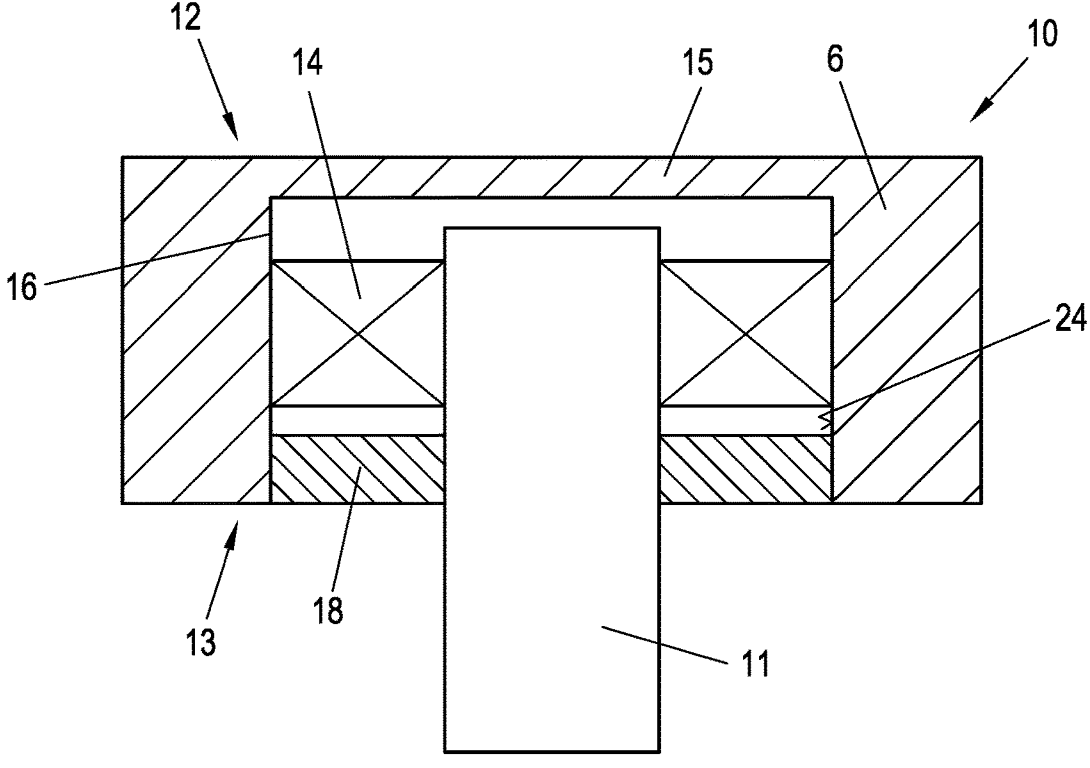
FIG. 3 is an embodiment of the roller in the form of a guide roller arrangement.

In an embodiment, the at least one roller 6 is part of a guide roller arrangement 10, as shown in FIG. 3. The guide roller arrangement 10 consists of the roller 6 or the roller unit and the shaft journal 11, wherein the roller 6 or the roller unit is mounted on the shaft journal 11 as described above. Such an arrangement has the advantage that the guide roller arrangement 10, and thus also the roller 6 or the roller unit, can be easily replaced. For this purpose, the guide roller arrangement 10 can be replaceable attached to the base body 9 with the free end of the shaft journal 11, for example screwed into an internal thread on the base body 9 or screwed onto a threaded pin on the base body 9 with an internal thread on the shaft journal 11.

Figure 5:
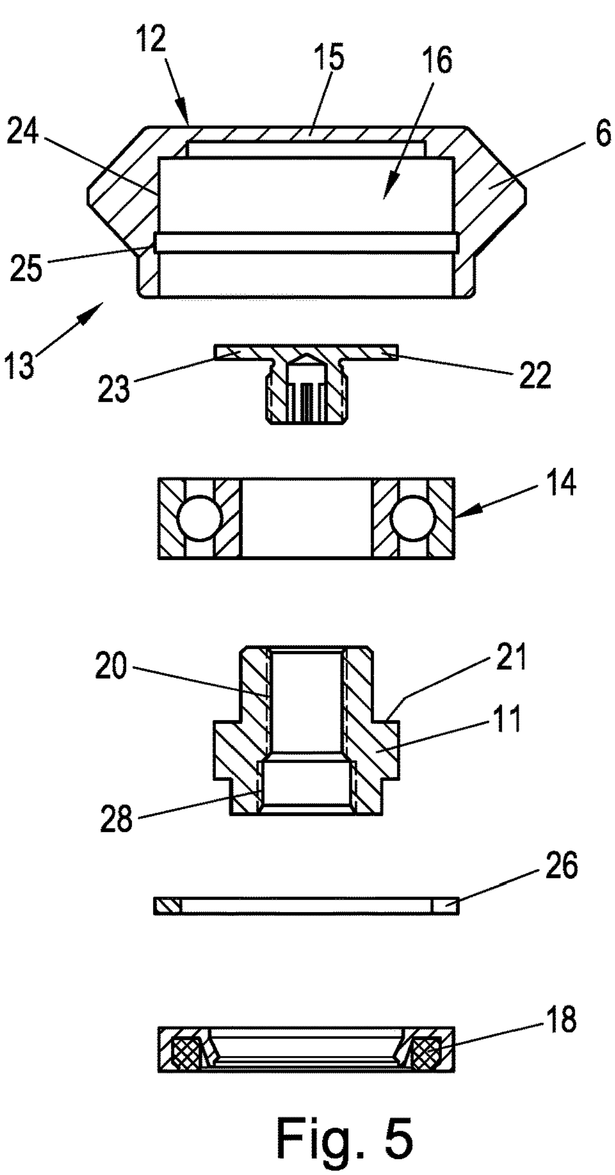
FIGS. 4 and 5 are a possible implementation of a guide roller arrangement.
Figure 4:
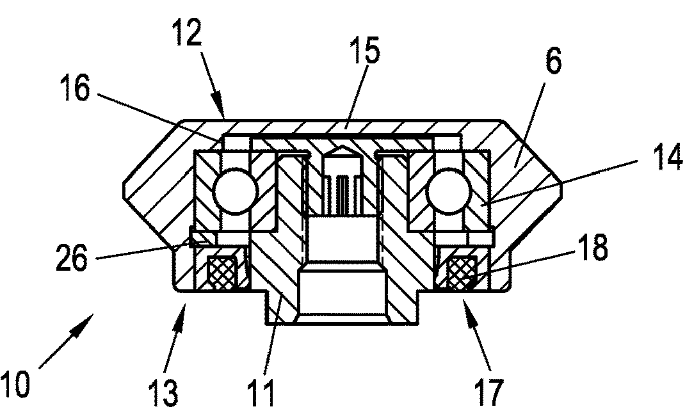

A possible configuration of a guide roller arrangement 10 is shown in FIGS. 4 and 5, wherein FIG. 5 shows an exploded view of the arrangement in FIG. 4.

In this configuration, the shaft journal 11 is a hollow journal with a first internal thread 20 at a first axial end of the shaft journal 11. Radially on the outside, the shaft journal 11 is radially stepped at this first axial end. The inner ring of a rolling bearing is applied to this radial step 21 as a bearing arrangement 14. At the opposite axial end of the rolling bearing, a fixing cap 22 with an external thread is screwed into the first internal thread of the shaft journal 11. A radially projecting fixing collar 23 on the fixing cap 22 also rests on the inner ring of the rolling bearing in the mounted position and presses the inner ring against the step 21. The inner ring is thus fixed to the shaft journal 11. The outer ring of the rolling bearing is pressed into the bearing recess 16 such that the roller 6 is fixed to the outer ring of the rolling bearing. For this purpose, the outer diameter of the outer ring of the rolling bearing and the inner diameter of the inner circumferential surface 24 form, for example, a press-fit in the region of the bearing arrangement 14. The outer ring can be additionally fixed axially with a retaining ring 26, which is inserted in a circumferential groove 25 in the inner circumferential surface 24 of the bearing recess 16. A shaft sealing ring is inserted as a sealing unit 18 in the free annular region 17 in the region of the second axial end face 13 and between the shaft journal 11 and the circumferential surface 24 of the bearing recess 16.

The shaft sealing ring can be designed with a radially inner sealing lip (as in FIGS. 4 and 5) which rests on the shaft journal 11 and seals against the shaft journal 11. In this configuration, the shaft sealing ring rotates with the roller 6. The shaft sealing ring can, however, also be designed with a radially outer sealing lip. In this configuration, the shaft sealing ring can be arranged so that it cannot rotate with the shaft journal 11. Of course, there are a multitude of other possible configurations of a shaft sealing ring, for example with multiple sealing lips or in a configuration as an axial shaft sealing ring.

A second internal thread 28 can be provided at the second axial end of the shaft journal 11. Via this second internal thread 28, the guide roller arrangement 10 can be screwed onto a threaded journal 27 (FIG. 6) on the base body 9 of the transport unit 5.

Figure 6:
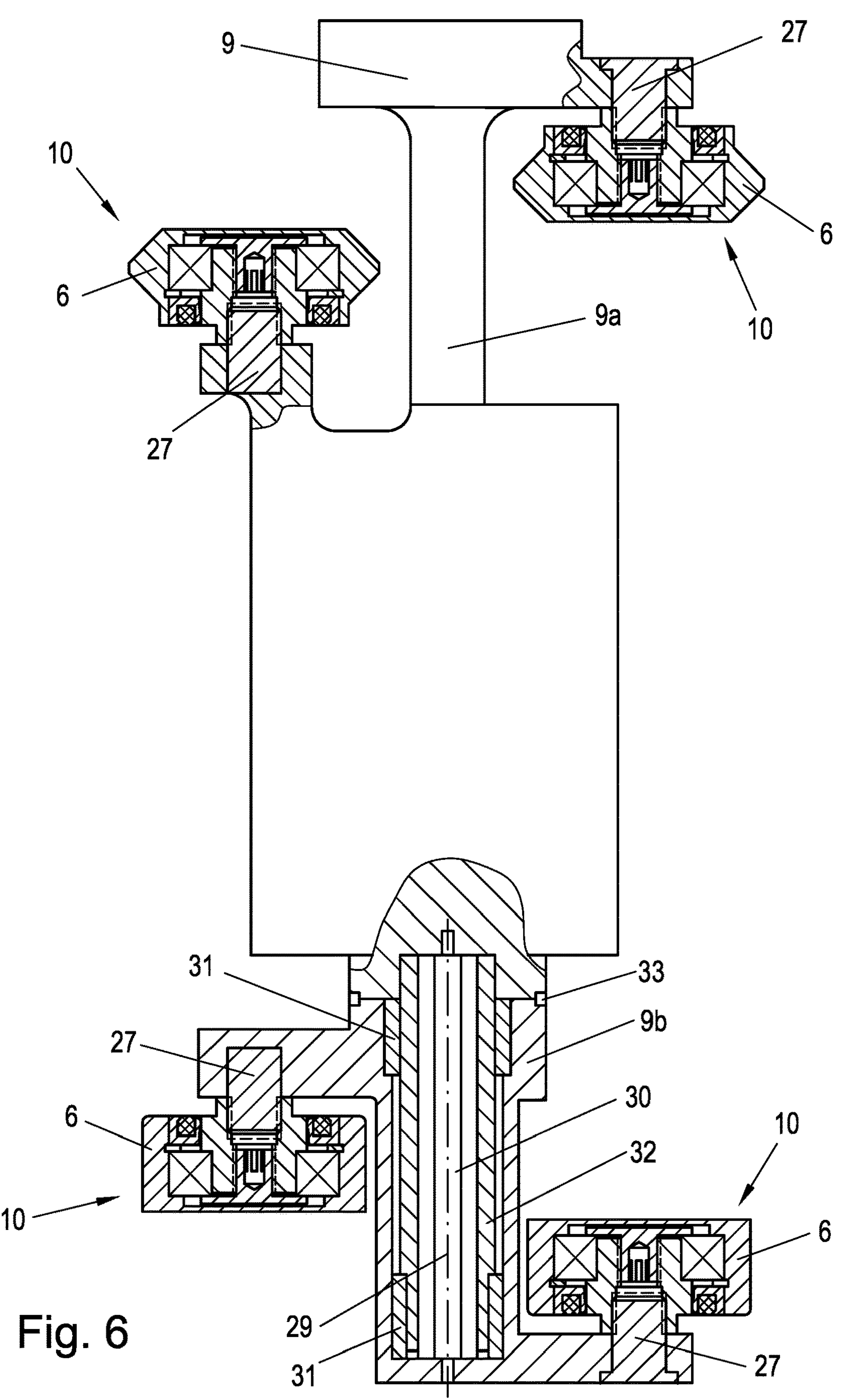
FIG. 6 is a split transport unit with rollers according to the present disclosure and a torsion bar spring.

FIG. 6 shows a transport unit 5 with four rollers 6. In the shown embodiment, all rollers 6 are part of a guide roller arrangement 10, but this does not necessarily have to be the case. The guide roller assemblies 10 are fastened to threaded journals 27 on the transport unit 5, in this case screwed on. The threaded journals 27 are attached to the transport unit 5 in a suitable manner, for example pressed into a recess in the transport unit 5, or welded therein, or screwed into an internal thread on the transport unit 5.

It is known that a body with four support points is usually statically overdetermined due to the usual tolerances and therefore rests securely on only three of the support points. In the case of a transport unit 5, this can mean that the transport unit 5 is only guided on three rollers 6, such that a roller 6 does not roll at all on the assigned running surface 7. This can also lead to the transport unit 5 experiencing, in addition to the desired forward movement, undesirable movements relative to the transport path 2.

To avoid this, in the configuration of the transport unit 5 according to FIG. 6 the base body 9 is designed in two parts. The first base body part **9*a* and the second base body part 9*b* are rotatably arranged relative to one another about an axis of rotation 29. According to some embodiments, the axis of rotation 29 is aligned normal to the direction of movement x. A torsion bar 30 is arranged between the first base body part 9*a* and the second base body part 9*b***.

Due to the drive magnet arrangement 8 on the transport unit 5, an attractive force arises which pulls the transport unit 5 in the direction of the transport path 2, whereby the transport unit 5 is also held on the transport path 2 and does not fall down. This attractive force is distributed at the contact points of the rollers 6 on the assigned running surfaces 7, whereby normal forces act on the rollers 6 (normal to the running surfaces 7). These normal forces cause a torque and thus a torsion in certain components of the transport unit 5 on which the rollers 6 are arranged. Due to these acting normal forces, the first base body part **9*a* is also twisted relative to the second base body part 9*b*, counter to the effect of the torsion bar 30. This ensures that the transport unit 5 always rests securely on all rollers 6 on the corresponding running surfaces 7** and rolls along them.

The torsion bar 30 is twisted by the normal forces from a zero position in which no torsional stress acts in the torsion bar 30, whereby a torsional stress arises in the torsion bar 30 depending on the angle of twist. In addition to the normal forces, the resulting torsional stress is of course also dependent on the geometry of the torsion bar 30, for example on the diameter, and on the material of the torsion bar 30, usually steel. The normal forces acting during operation of the transport unit 5 or the resulting torque can be assumed to be known from the design and geometry of the transport unit 5.

The torsional stress in the torsion bar 30 resulting from the normal forces acting during operation of the transport unit 5, and thus also the directly associated spring effect of the torsion bar 30, can therefore be adjusted via the geometry of the torsion bar 30, in particular the diameter of the torsion bar 30. It has been found that the torsion bar 30 is advantageously designed such that the torsional stress in the torsion bar 30 resulting from the normal forces acting on the rollers 6 during operation of the transport unit 5 is in the range of 40%, in some embodiments 50%, up to a maximum of 100% of the maximum permissible torsional stress of the torsion bar 30.

The maximum permissible torsional stress is a material parameter of the material of the torsion bar 30 and is known. The torsional stress in the torsion spring 30 should not exceed this maximum permissible torsional stress, because this would lead to an undesirable plastic deformation of the torsion bar 30. If the torsional stress in the torsion spring 30 were less than 40%, the spring effect would be too low for this application and thus the torsional stiffness would also be too low.

The torsion bar 30 can therefore be used to adjust the torsional stiffness of a transport unit 5 with a split base body 9 in a simple manner and with little space requirement.

This could also be achieved by mechanically weakening the transport unit 5 at a certain point, for example by a suitable geometry, such that the desired torsional stiffness is achieved at this point. However, this would have the disadvantage of weakening the transport unit 5 not only in terms of torsion, but also with regard to other aspects. For example, this could also limit the permissible load or a permissible propulsion force for moving the transport unit 5, which would be undesirable. The torsion bar 30 can be used to selectively adjust the torsional stiffness without having to make compromises at other points.

The torsion bar 30 is arranged rotationally fixed in the first base body part **9*a* and rotationally fixed in the second base body part 9*b*, for example in a force-fit, form-fit or material-fit (or a combination thereof), for example by pressing in, gluing or welding. The torsion bar 30 thus connects the first base body part 9***a* and the second base body part 9*b* to one another, and these can be twisted relative to one another via the torsion bar 30.

In the configuration according to FIG. 6, in the second base body part 9*b*, bearings 31, for example plain bearings or rolling bearings, are arranged, on which a part of the first base body part 9*a*, for example a rotary sleeve 32, is rotatably mounted.

A sealing element 33, such as a sealing ring, can also be arranged between the first base body part 9*a* and the second base body part 9*b*. The sealing element 33 prevents the penetration of liquid, which is particularly important in hygienic applications.

The use of a torsion bar 30 in a transport unit 5 of a long stator linear motor for setting a desired torsional stiffness is of course independent of the configuration of the rollers 6 of the transport unit 5, which therefore do not necessarily have to be designed as described above with reference to FIGS. 2 to 5.

A transport unit 5 of a long stator linear motor can therefore also be characterized by the following features.

The transport unit consists of a base body 9 with a drive magnet arrangement 8 on which a plurality of rollers 6 are rotatably mounted. The base body 9 consists of a first base body part 9*a* and a second base body part 9*b*, which can be twisted relative to one another in that a torsion bar 30 is arranged in the first base body part 9*a* and in the second base body part 9*b* in a rotationally fixed manner, and the torsion bar 30 connects the first base body part 9*a* and the second base body part 9*b* in a twistable manner.

It is advantageous, if a torsional stress occurring in the torsion bar 30 during operation of the transport unit 5 is in the range between 40% and 100% of a known maximum permissible torsional stress (a material parameter of the material of the torsion bar 30). This can be set by designing the geometry of the torsion bar 30, in particular a diameter of the torsion bar 30.

In addition, a bearing 31 can be provided on such a transport unit 5 in the second base body part 9*b*, in which bearing a part of the first base body part 9*a* is rotatably mounted. This makes it possible to ensure that the transport unit 5, apart from the desired torsional stiffness, is not weakened or not weakened too much in terms of strength or stiffness.

Furthermore, a sealing element 33 can be arranged between the first base body part 9*a* and the second base body part 9*b*.

The invention claimed is:

1. A transport unit for a long stator linear motor having a base body which comprises a drive magnet arrangement for moving the transport unit along a transport path and for holding the transport unit on the transport path, wherein at least one shaft journal is arranged on the base body, on the shaft journal a roller is rotatably mounted, wherein the roller has a first axial end face and an opposite second axial end face, and a bearing arrangement is provided between the first axial end face and the second axial end face, by the bearing arrangement the roller is mounted rotatably on the shaft journal, wherein the first axial end face is closed by an end wall, and the second end face is open, such that a bearing recess is formed inside the roller, wherein the bearing recess is axially limited on one side by the end wall, wherein the shaft journal projects through the open second axial end face into the bearing recess, and the bearing arrangement is arranged in the bearing recess on the shaft journal, wherein in the region of the second end face, an annular region forming between the centrally arranged shaft journal and the inner circumferential surface of the bearing recess is closed off by a sealing unit, and wherein the base body consists of a first base body part and a second base body part which can be twisted relative to one another in that a torsion bar is arranged in the first base body part and in the second base body part in a rotationally fixed manner, and the torsion bar connects the first base body part and the second base body part in a twistable manner.

2. The transport unit according to claim 1, wherein the torsion bar is designed such that a torsional stress occurring in the torsion bar during operation of the transport unit is in the range between 40% and 100% of a maximum permissible torsional stress, and wherein the maximum permissible torsional stress is a known material parameter of a material of the torsion bar.

3. The transport unit according to claim 1, wherein in the second base body part, a bearing is provided in which a part of the first base body part is rotatably mounted.

4. The transport unit according to claim 1, wherein a sealing element is arranged between the first base body part and the second base body part.

5. The transport unit according to claim 1, wherein an axis of rotation about which the first body and the second base body are rotatably arranged relative to one another is aligned normal to a direction of movement of the transport unit.

* * * * *